Sept. 2, 1947.   A. V. D. WILLGOOS ET AL   2,426,877
RADIAL AIRCRAFT ENGINE
Filed Oct. 20, 1944   5 Sheets-Sheet 4

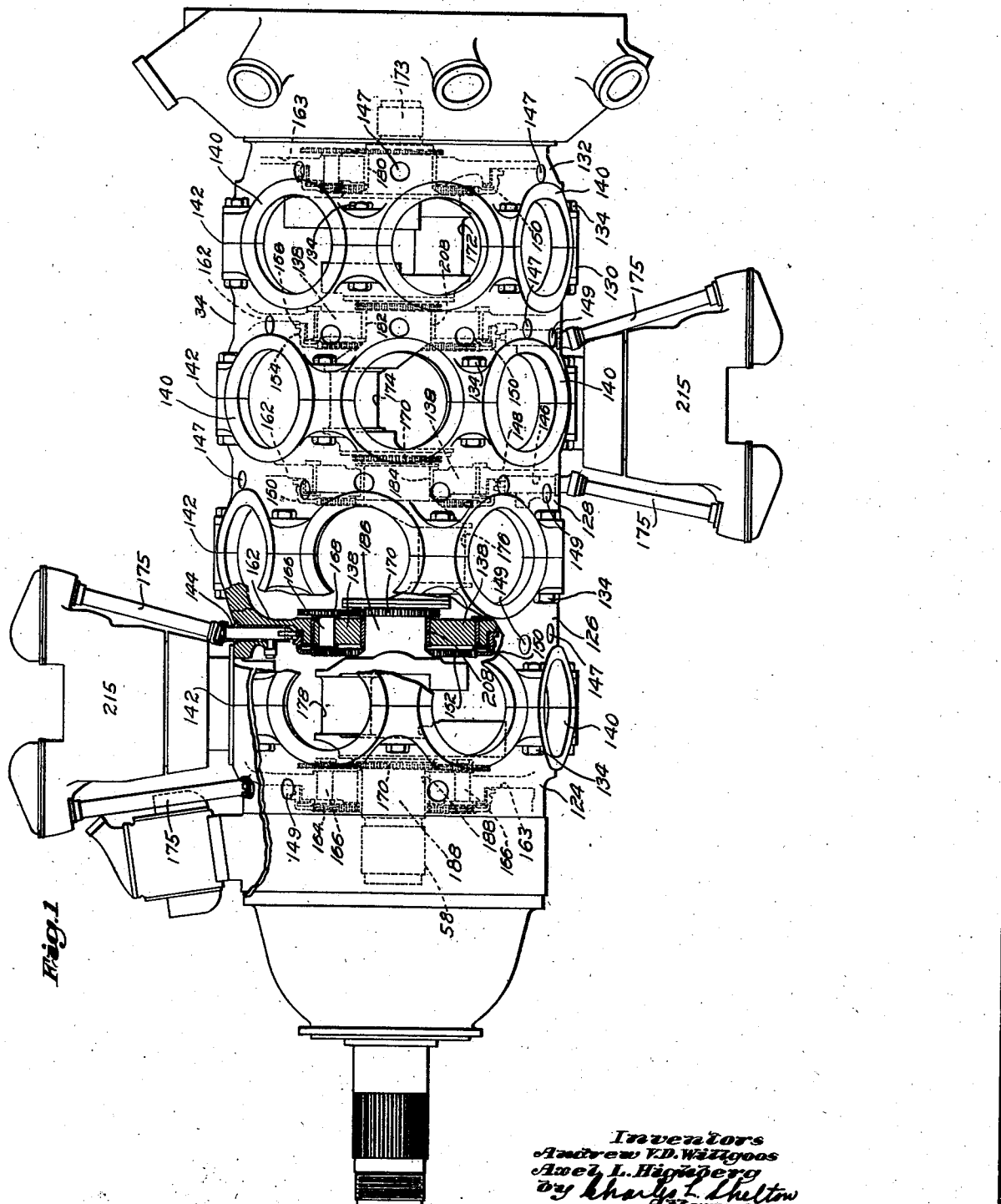

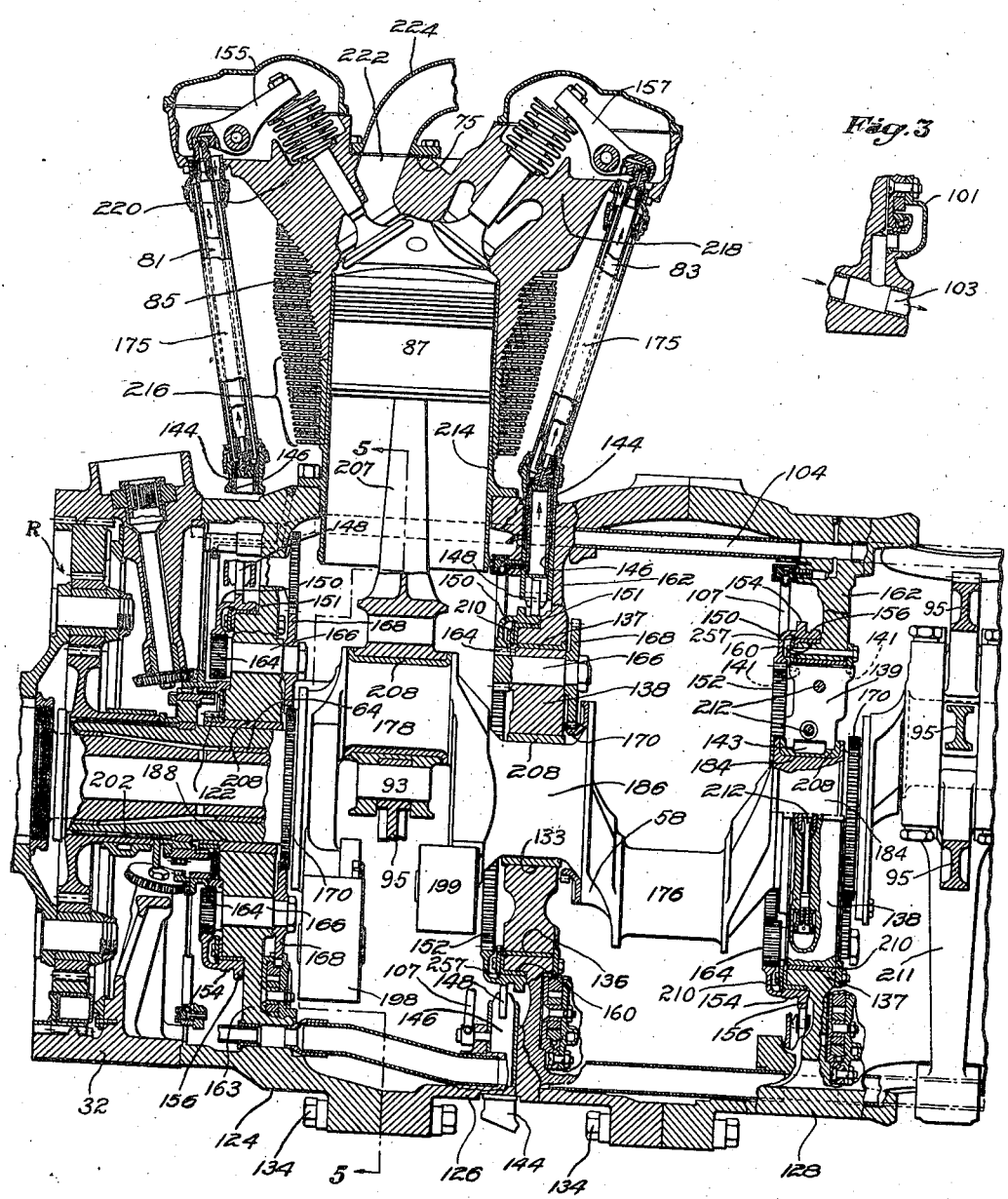

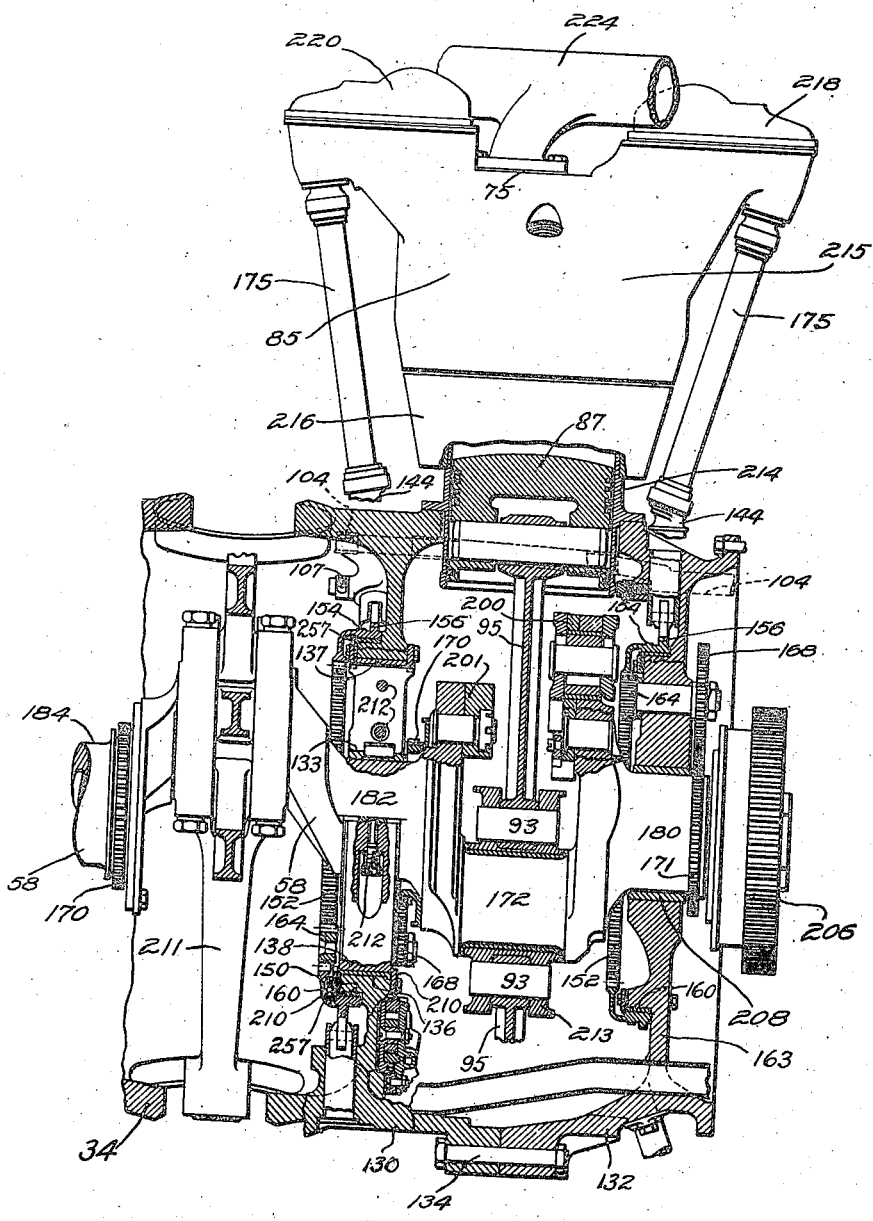

Inventors
Andrew V. D. Willgoos
Axel L. Högberg
by Charles J. Shelton
Attorney

Patented Sept. 2, 1947

2,426,877

UNITED STATES PATENT OFFICE 2,426,877

RADIAL AIRCRAFT ENGINE

Andrew V. D. Willgoos and Axel L. Highberg, West Hartford, Conn., assignors to United Aircraft Corporation, East Hartford, Conn., a corporation of Delaware Application October 20, 1944, Serial No. 559,636

10 Claims. (Cl. 123—55)

This invention relates to multi-row radial aircraft engines.

An object of this invention is to provide improvements in crankcase structure for aircraft engines.

A further object of this invention is to provide a novel and improved structure adapted for mounting a one-piece crankshaft and for mounting and driving mechanism such as valve cam rings and related crankcase mechanism in the crankcase of a multi-row radial aircraft engine, particularly a four-row radial engine having seven cylinders in each row.

Other objects and advantages will be apparent from the specification and claims, and from the accompanying drawing which illustrates what is now considered to be a preferred embodiment of the invention.

In the drawings,

Fig. 1 is a side view of an aircraft engine, with some parts omitted in order to simplify the drawing, incorporating crankcase mechanism constructed according to this invention.

Figs. 2 and 4 are enlarged views which together in the order named, represent a longitudinal section through the crankcase portion of the engine of Fig. 1. Certain parts have been omitted or displaced from their true position in order to simplify the drawing.

Fig. 3 is a partial section showing the connection between a crankcase scavenge pump and the main scavenge oil line.

Figure 5:
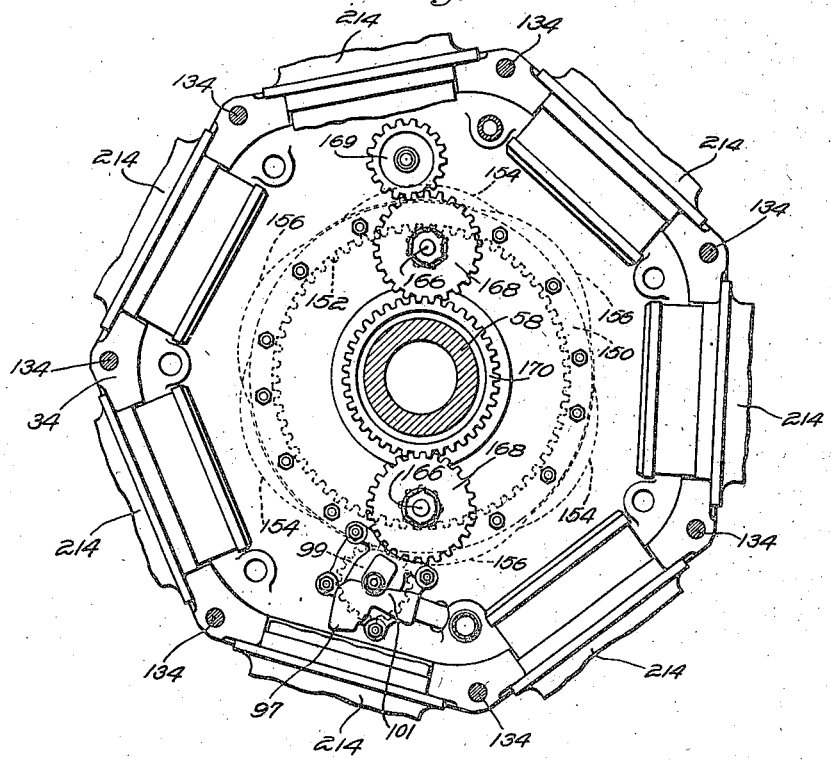
Fig. 5 is a transverse section on the line 5—5 of Fig. 2.

Aircraft engines must be reliable in operation, yet compact, lightweight, and easy to assemble and maintain. According to this invention these requirements are met and other advantages are provided for the mechanism within the crankcase by a novel constructional combination and arrangement of crankcase parts including the crankshaft supporting means and the valve cam ring supporting and driving means.

Referring to the drawing, Fig. 1 illustrates an aircooled engine having twenty-eight cylinders arranged in four circumferential rows and seven spiral banks. Reference is made to Hobbs-Willgoos application, Serial No. 552,372 for a detailed description of this engine as a whole.

The main crankcase 34 consists of five integral machined aluminum alloy forgings 124, 126, 128, 130 and 132, which are secured together on transverse parting lines 142 with bolts 134. The three intermediate sections have large bores 136 (Figs. 2, 4 and 7) which are fitted with steel liners 137. Magnesium alloy crankshaft bearing supports or disks 138 fit removably within the liners 137, which are shrunk to form a permanent fit in the three intermediate crankcase partitions 162 at all engine operating temperatures. The two end crankcase sections have integral partitions 163 extending the full distance inwardly to the front and rear main bearings 208.

Figure 7:
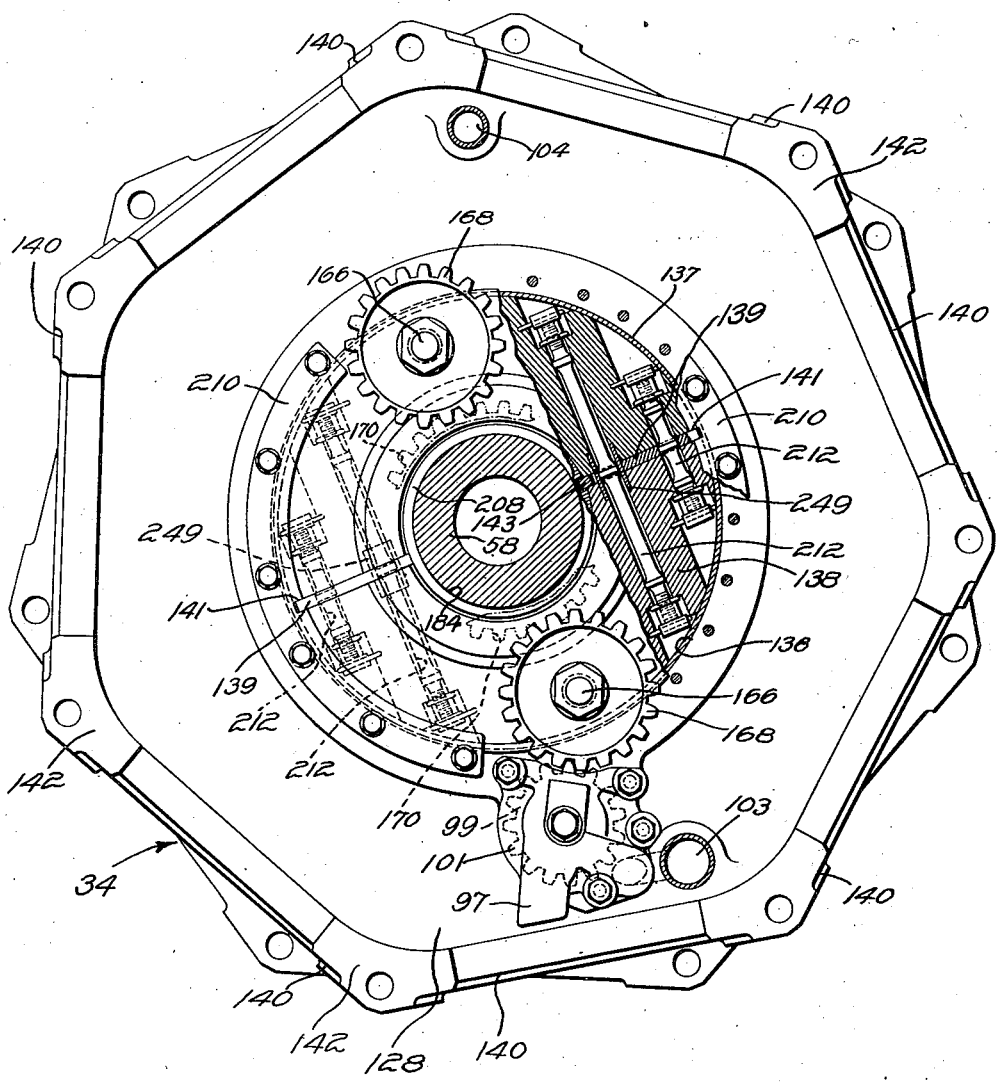
Fig. 7 is a transverse view, partially broken away, taken immediately in back of the center crankcase partition, looking toward the front showing the crankshaft supporting means and cam and scavenge pump drives.

Twenty-eight cylinder mounting pads 140 are spaced around the outside of the five crankcase sections in four rows of seven pads (Figs. 1 and 7). The center line of each row is located at the parting face 142 between two adjacent sections. Studs (not shown) are provided on the crankcase to hold each cylinder 215 in place on its mounting pad 140 so that the cylinder may be mounted in either of two opposed positions. Thus the cooling airflow may be maintained in the same direction of flow relative to the cylinders even though it be reversed in direction relative to the crankcase, so that either a pusher or tractor engine may be made from the same cylinder and crankcase parts, as disclosed and claimed in the Willgoos application Serial No. 444,033 (Patent No. 2,401,211).

The valve mechanism is of the overhead rocker box poppet valve type utilizing one intake and one exhaust valve in each cylinder and having intake and exhaust rocker arms 155, 157 and push rods 81, 83 actuated by fifty-six valve tappets reciprocating in tappet guides 144 symmetrically spaced around the outside of the five sections, in circular rows at the front and rear of each of the rows of cylinder mounting pads. Tappet guides 144 are of aluminum alloy shrunk into holes 147, 149 in the crankcase sections. There are four rows of holes 147 for the exhaust valve tappet guides and four rows of holes 149 for the intake valve tappet guides (Fig. 1); with two rows of interpositioned exhaust and intake tappet guide holes between each two adjacent cylinder rows. Tappets 146 reciprocate within their guides 144 in the conventional manner and are provided with rollers 148 which run on the intake cam tracks 154 and the exhaust cam tracks 156 on the cam rings 150.

The five cams 150 are preferably identical, each having an internal annular gear 152 and external intake and exhaust tracks 154, 156 of three lobes each. Each cam is mounted on an aluminum alloy bearing ring 151 which fits onto a shelf 160 machined in the front wall of the partitions 162, 163 of the corresponding section of the crankcase. Each cam is driven in the opposite direction to crankshaft rotation at 1/6 crankshaft speed by the crankshaft through two cam reduction pinions 164 mounted on upper and lower pinion shafts 166 rotatably supported in the end partitions 163 and in the disks 138. Cam reduction gears 168 are splined to the rear of the pinion shafts on the opposite sides of the corresponding crankcase partitions. Each pair of upper and lower cam reduction gears 168 mesh with a separate cam drive gear 170, 171 mounted on the crankshaft 58. The front four cam drive gears 170 are split and bolted to the crankshaft to form continuous gears while the rear cam drive gear 171 is of one-piece construction and is splined to the crankshaft.

Crankshaft 58 is supported within crankcase 34 by five steel backed sleeve bearings 208 having silver and specially processed lead on their inside surface. The center main bearing is flanged for locating the shaft axially and transmitting thrust to the crankcase. The front and rear bearings are of one-piece construction and are pressed and pinned into central bores in the partitions 163 of the corresponding crankcase sections 124, 132. The front intermediate, center, and rear intermediate main bearings are split along their horizontal center lines and are held securely within central bores 133 in the bearing support disks 138, which are each split to form two segments having flat keys 139 between their parting faces. These keys have projections fitting within slots 141 in segmental plates 210 (Fig. 7) bolted to opposite sides of the partitions 162, to prevent the disks from turning, and the bearings 208 are locked against rotation relative to the disks by the small keys 143, fitted between the disk halves. Plates 210 extend radially past the parting lines between the disks and the crankcase partitions to prevent axial displacement of the disks. In Figs. 2 and 4, the upper portions of the center and rear disks 138 have been displaced from their normal position in order to more clearly show this construction. The two halves of each disk are bolted together with the two keys 139 and the key 143 therebetween by bolts 212. Dowel bushings 249 (Fig. 7), one at each side of the corresponding main bearing, fit into recesses in each of the two disk halves and serve to align the disk halves and plates. Thus, each crankcase partition 162 with its associated liner 137, plates 210, keys 139, disk 138, bearing 208 and key 143 constitute after assembly, a rigid wall which retains and supports the crankshaft on the intermediate journals 182, 184, 186. The front and rear journals 180, 188 are mounted in bearings supported by the integral partition walls 163.

The three crankshaft bearing support disks 138 are made of magnesium alloy having a higher coefficient of thermal expansion than the coefficient of thermal expansion of the aluminum alloy of the crankcase. They are machined to an outer diameter providing a sliding fit between the disks and the liners 137 at room temperature, but because they have a higher coefficient of expansion than the crankcase they expand more than do the bores 136 as the engine temperature rises a hundred or more degrees to the operating temperature range, thus providing the equivalent of a shrink fit between the disks 138 and partitions 162 and liners 137 during engine operation, thereby providing additional means for locking the disk to the crankcase when the stresses are greatest. Yet at room temperature the parts may be readily assembled by placing the crankshaft journal 180 in the bearing 208 of the rear crankcase section 132, assembling the master rod 213 and link rods 95 on the rear crankpin 172, assembling the main bearing halves, disk halves, and keys around the crankshaft journal 182, bolting the disk halves together with the four bolts 212, sliding the crankcase section 130, with its liner 137, over the disk assembly, placing the cam ring 150 on the bearing 151 on the shelf 160, and bolting the retaining plates 210 to the partition 162 to lock the disk assembly to the crankcase. The two front plates 210 have radial projections 251 which fit against an annular shoulder on the interior of the cam ring to hold it in place on the bearing 151. This same process is repeated for the succeeding two crankcase sections 128, 126 and then the front section 124 with its bearing 208 is placed over the front crankshaft journal 188. Thus the crankshaft may be made of one-piece construction and each crankcase section may be made one-piece circumferentially, or circumferentially integral, and yet the parts may be easily assembled to form a very strong and light crankcase and crankshaft construction.

A cam drive shaft 166 and its associated gears 164, 168 is rotatably mounted in each half of each disk 138. The disks are angularly positioned relative to the crankcase by the projections on keys 139 which fit within slots 141 in the plates 210 and thus the cam drive gears are also located in a predetermined manner relative to the cam rings 150 and the intermediate cam drive gears 170 on the crankshaft. The disk assemblies are identical (with the exception that the inner portion of the center disk is shaped to fit within the crankshaft locating flanges on opposite sides of the center crankshaft journal 184), and the disks are angularly displaced with respect to each other by an amount corresponding to the differences in valve timing of the respective cylinder rows resulting from the spiral displacement of the cylinder banks. The relative disk locations are determined in the construction shown simply by predetermining the position of the plates 210 and the slots 141, which locate the plates 139. By supporting the cam drive shafts 166 in the disk halves the diameter of the cam rings 150 and of the gears 164, 168 may be made a minimum, thus providing a compact construction.

Crankshaft 58 is a one-piece machined steel forging which is carefully balanced. It has four crankpins 172, 174, 176, 178, and five main journals 180, 182, 184, 186, 188, located at the ends and between the crankpins. The center journal has flanged ends 190, 192, which locate the shaft axially and transmit thrust through the center bearing and its disk support 138 and partition 162 to the crankcase. Four counterweights are used; two of them 199, 201 being located directly opposite the rear crankpin in the plane of the corresponding crankthrow. The other two counterweights 198, 200, are also located opposite the front and rear crankpins, respectively, but are angularly offset from the plane of the corresponding crankthrow by an angle of 2°22'. The extreme front and rear counterweights may be pivotally suspended on the crankshaft to form torsional vibration dampers. Cam drive gears 170 are supported on flanges adjacent each main bearing. The front of the crankshaft is provided with splines 202 for driving the reduction gear R. The rear of the crankshaft is provided with a quill 173 attached in the rear journal of the crankshaft and which has external splines 104 thereon for driving a hydraulic damper 206. Quill 173 also provides a support and drive for the rear cam drive gear 171. Reference is made to application Serial No. 552,370 filed September 1, 1944, for a more detailed description of the crankshaft.

The crankpins are connected to forged aluminum alloy pistons 87 in corresponding cylinder rows by an articulated connecting rod system including master rods, three of which are shown at 207, 211 and 213, having their big ends journalled on the crankpins and on which link rods 95 are pivoted at 93.

Each of the twenty-eight cylinder assemblies, which are identical, comprise an alloy steel barrel 214, an aluminum alloy cooling muff 216 shrunk on the barrel, and an aluminum alloy head 85 having a flat top 75 and opposed rocker boxes 218, 220 projecting laterally therefrom in the general direction of the cooling airflow. The head and muff abut and are machined to form cooling fins extending continuously from the bottom of the muff to the flat top 75 of the head 85. Each fin lies in a plane normal to the cylinder axis and parallel to the direction of cooling airflow and the intake rocker boxes 220 are positioned symmetrically opposite the exhaust rocker boxes 218 so that each cylinder may be operatively mounted in either of two directly opposed positions on the same crankcase. Thus the intake and exhaust rocker boxes may be interchanged by rotating each cylinder through 180°, enabling either a pusher or a tractor type engine to be assembled from the same cylinder and crankcase parts, except for the cam rings 150 which have their lobes at different locations for the two engine types.

Most of the lubrication details have been omitted in order to simplify the drawing. In general, oil is supplied from a tank (not shown) by a pump (not shown) to the top crankcase pressure line 104. The pressure oil is fed to the interior of the push rods, and through them to the rocker boxes, by ring manifolds 107, connected to line 104 and to each tappet. Torquemeter booster pump 82 (Fig. 6) which is driven by gear 169 (Fig. 5) off the top front cam drive gear 168 is also connected to and supplied from line 104. This pump may be used to supply oil under high pressure to a torquemeter associated with the reduction gear R in the magneto section 32, or for other purposes.

Figure 6:
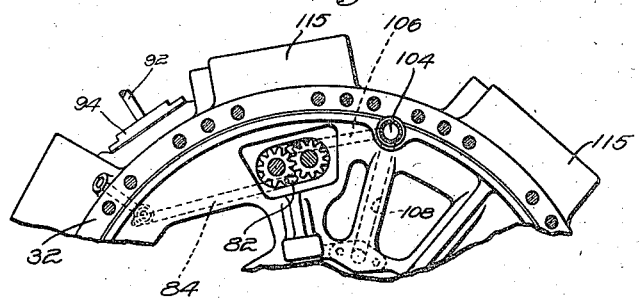
Fig. 6 is a partial transverse section taken immediately in front of the first crankcase partition, looking toward the front, showing the torquemeter booster pump.

Drain oil from at least some of the rocker boxes is returned to the crankcase through the push rod cover tubes 175. This oil and crankcase drain oil is scavenged by a separate pump 101, of the internal external gear type, in each of the four crankcase chambers. Each pump is driven off the lower cam drive gear 168 by a gear 99 (Figs. 5, 7). These pumps each pick up crankcase drain oil through inlets 97 and discharge into the main scavenge oil line 103, which has its outlet end connected with the oil tank. Thus each crankcase chamber is efficiently scavenged regardless of the flight attitude of the aircraft, by a series of pumps having independent drives and discharging into a common manifold.

It is to be understood that the invention is not limited to the specific embodiment herein illustrated and described. For instance, it may be used in engines having five or nine longitudinal banks, or more than four circumferential rows, or in other ways without departure from its spirit as defined by the following claims.

We claim:

1. In an aircraft engine, a multi-throw one piece crankshaft, a plurality of one piece crankcase sections coaxially secured together on transverse parting faces, and a crankshaft supporting disk mounted in each of said sections midway between the parting faces thereof, each of said disks having a relatively large outer periphery engaging a crankcase section and having a relatively small central opening for receiving a crankshaft journal, the maximum radius of said opening being smaller than the maximum radius of the crankthrows on said crankshaft.

2. The combination of claim 1, in which said disks are split and are mounted in partitions integral with said crankcase sections.

3. Means for rotatably supporting a multi-throw engine crankshaft in an engine crankcase comprising, a wall portion in said crankcase having an opening therein, and a crankshaft supporting member having a sliding fit in said opening at room temperatures, said member having a coefficient of thermal expansion which is sufficiently greater than the coefficient of thermal expansion of said wall portion to provide a tight fit between said member and said wall portion at engine operating temperatures.

4. In a radial engine having a multi-throw crankshaft, a crankcase having an internal partition member, an opening in said partition member which is sufficiently large to enable said crankshaft to be passed therethrough, and a split disk mounted in said opening, said disk having a coefficient of thermal expansion greater than that of said partition member and having a peripheral surface forming a sliding fit with said partition member at room temperature and a tight fit with said partition member at engine operating temperatures, said disk having a central opening of small diameter in relation to the outside diameter of said disk adapted to receive and support a journal portion of said crankshaft.

5. In a radial engine, a crankcase having a partition therein integral therewith, a main bearing supporting disk removably mounted in said partition, said disk having an openng therein for receiving a bearing sleeve for said crankshaft, said opening being of relatively small diameter as compared to the outer diameter of said disk, said disk having a coefficient of thermal expansion which is greater than the coefficient of thermal expansion of said partition.

6. In a radial engine, a plurality of one piece sections adapted to be secured together on transverse parting faces to form a crankcase which is circumferentially integral and longitudinally sectioned, and means for mounting a one piece crankshaft having multiple throws in said crankcase comprising, a partition within each crankcase section integral therewith, an opening for receiving a crankshaft main bearing in each of the partitions of the end crankcase sections, and split supporting members removably mounted in each of the intermediate partitions, each of said members having an opening therein of smaller radial dimensions than said crankshaft throws for receiving a crankshaft main bearing, said members being of greater radial dimensions than said crankshaft throws, and having coefficients of thermal expansion greater than that of the crankcase.

7. A crankshaft support and cam drive mechanism for a radial engine comprising, a crankcase section, a partition in said crankcase section, a bearing surface on said partition, a cam ring mounted on said surface, a disk removably mounted in an opening in said partition, an opening in said disk for receiving a crankshaft journal, and at least one drive shaft mounted on said disk and having gears thereon respectively meshing with gears on said cam ring and said crankshaft.

8. In an internal combustion engine having a crankcase, a crankshaft having a plurality of main journals, partitions in said crankcase provided with apertures of sufficient size for said crankshaft to pass therethrough, a split collar member in each aperture secured to the respective partition and substantially filling the space between the walls of the aperture and the respective main journal, and at least one valve cam drive shaft carried by each collar and driven by said crankshaft.

9. The combination of claim 1, including means associated with at least one of said disks for resisting axial movements of said crankshaft.

10. The combination of claim 7, including means connected with said disk for locating said disk in a predetermined position angularly with respect to said partition.

ANDREW V. D. WILLGOOS.
AXEL L. HIGHBERG.

REFERENCES CITED

The following references are of record in the file of this patent:

UNITED STATES PATENTS

| Number | Name | Date |
|---|---|---|
| 1,355,451 | Carpenter | Oct. 12, 1920 |
| 2,209,013 | Barkeij | July 23, 1940 |
| 1,835,138 | Bowman | Dec. 8, 1931 |
| 1,999,374 | Pavleeka | Apr. 30, 1935 |
| 2,154,359 | Sarazin | Apr. 11, 1939 |

FOREIGN PATENTS

| Number | Country | Date |
|---|---|---|
| 497,592 | England | 1938 |
| 538,779 | England | 1941 |
| 320,879 | England | 1929 |
| 826,107 | France | Mar. 23, 1938 |